Jan. 13, 1931.   R. D. MAILEY ET AL   1,788,954
GLASS WORKING MACHINERY
Filed Nov. 28, 1925   7 Sheets-Sheet 1

Fig.1

Roy D. Mailey and
Wilford J. Brinninghoff
INVENTORS

BY Thos. H. Brown
ATTORNEY

Jan. 13, 1931.  R. D. MAILEY ET AL  1,788,954
GLASS WORKING MACHINERY
Filed Nov. 28, 1925  7 Sheets-Sheet 3

Roy D. Mailey and
Wilford J. Winninghoff
INVENTORS

BY
Thos. H. Brown
ATTORNEY

Jan. 13, 1931.  R. D. MAILEY ET AL  1,788,954
GLASS WORKING MACHINERY
Filed Nov. 28, 1925    7 Sheets-Sheet 4

Jan. 13, 1931.   R. D. MAILEY ET AL   1,788,954
GLASS WORKING MACHINERY
Filed Nov. 28, 1925   7 Sheets-Sheet 7

Roy D. Mailey and
Wilford J. Winninghoff
INVENTORS

BY
Thos. H. Brown
ATTORNEY

Patented Jan. 13, 1931

1,788,954

UNITED STATES PATENT OFFICE

ROY D. MAILEY, OF EAST ORANGE, AND WILFORD J. WINNINGHOFF, OF SOUTH ORANGE, NEW JERSEY, ASSIGNORS TO GENERAL ELECTRIC VAPOR LAMP COMPANY, OF HOBOKEN, NEW JERSEY, A CORPORATION OF NEW JERSEY

GLASS-WORKING MACHINERY

Application filed November 28, 1925. Serial No. 71,881.

My present invention relates to glass blowing machinery for splicing together sections of glass tubing and particularly for splicing bulbs or tubes to tubular sections of glass. The apparatus of my invention is used particularly for welding together parts of the envelope of mercury vapor lamps but is useful in the art generally.

In making the envelopes for mercury vapor lamps, for example, an envelope is formed comprising a sealed glass tube terminating at one or both of its ends in a glass bulb or enlargement in which are provided suitable electrodes for maintaining an arc which extends through the tubular part of the envelope. In forming the envelope it is economical to use for the tubular part glass tubing such as is to be commonly found on the market and to weld or splice to such tubes of proper length a glass bulb which has been formed separately from the tube. In some cases of splicing it is necessary to provide means for mounting the tube and the bulb with their ends to be spliced in juxtaposition, means for simultaneously heating said adjacent ends to a welding or splicing temperature, means for moving them into splicing relation upon the attainment of such temperature, means for rotating the tube and the bulb together under a flame or other heating means for obtaining uniform heating throughout the portions welded or for moving the heating means relative thereto and means for maintaining and varying a pressure within the tube and bulb after the weld has been started for the purpose of working the glass being welded into a sound and complete weld.

In providing such above mentioned means it is necessary to take into consideration the peculiar shape of the parts which go to constitute the finished envelope as well as the shape of the finished envelope and to provide such means in forms which will permit and provide for a rapid and efficient production of the envelope as finished by the machine.

It is therefore an object of my invention to provide in a glass blowing machine of this type a clamp for firmly and securely holding a glass bulb by an engagement of a limited portion thereof and leaving the unclamped portion free for splicing and radiation of heat therefrom.

It is also an object of my invention to provide a quickly releasable and engageable clamping means for glass tubing which will accommodate within the clamp an enlargement or bulb on said tube.

It is also an object of my invention to provide such above mentioned clamps with means for rotating them about the axis of the parts being welded and with means for opening and closing them at any position of such rotation.

It is also an object of my invention to provide means for supporting said tube at desired points along its length which means will permit the rotation of the tube about its axis while being welded.

It is a further object of my invention to provide between said clamps and the means for rotation thereof a clutch for making and breaking the driving connection.

Other objects of my invention will appear from the specification and drawings forming a part thereof.

In the drawings:

Fig. 1 is a front elevation view of a glass blowing machine embodying my invention showing clamping means at each end of the machine, means for operating said clamps, means for engaging and disengaging the clamp driving means from the source of power, said engaging and disengaging means being connected with one of the clamp operating means whereby they are simultaneously operated to disengage the driving means when said clamp operating means is operated to open its clamp and for engaging the power means into driving relation when the clamp operating means is caused to close its clamp, means for moving one of said clamps toward the other, a separate tube supporting means and a heating means disposed between the two clamps, a source of air pressure having connection to a point within one of the clamps and a regulating means therefor.

Figure 20:
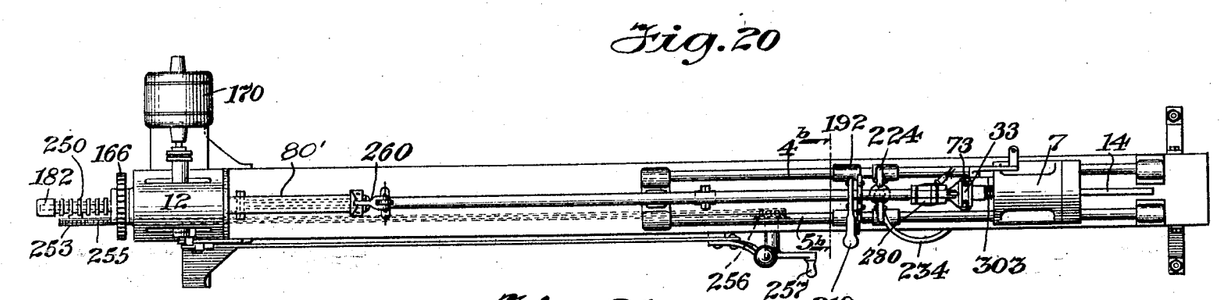
Fig. 20 is a plan view of the machine of Fig. 18.

Referring to Figs. 1 to 17 inclusive and to the part of Fig. 20 to the right of line b—b the supports 1 and 2 carry the longitudinal bed plate 3. At its right hand end bed plate 3 supports two parallel guide rods 4 and 5 (see Figs. 1 and 20) which are spaced above said bed plate 3 by the posts 6, 6. On these rods 4, 5 is slidably mounted the block member 7 which carries fixed to the bottom thereof facing downwardly the gear rack 8 which engages the pinion 9 mounted to bed plate 3 and rotatable thereon by the handles 10, 10 for the moving of said block member 7 through rack 8 to the left or to the right. At the opposite end of bed plate 3 is fixedly mounted the block member 12 which extends upwardly to about the same height as said block member 7. Between the block members 7 and 12 there extends and is journaled therein at its ends the shaft 14 over which slides said block member 7 when it is moved on the slide rods 4 and 5. On shaft 14 and rotatable therewith is mounted the gear 15 within block 7 and movable therewith, proper bearing surfaces being provided between the block and the sides of the gear and proper splining connection being provided between the gear and the shaft 14 to permit movement of the gear longitudinally thereon over said shaft 14. Journaled to the upper part of block 7 is the shaft 21 which carries on its outer end the gear 22 which through the pinions 23 and 24 is in mesh relation to said gear 15. At its inner end said shaft 21 carries the clamp member 25 which is mounted thereto through the sleeve 26.

Figure 1:
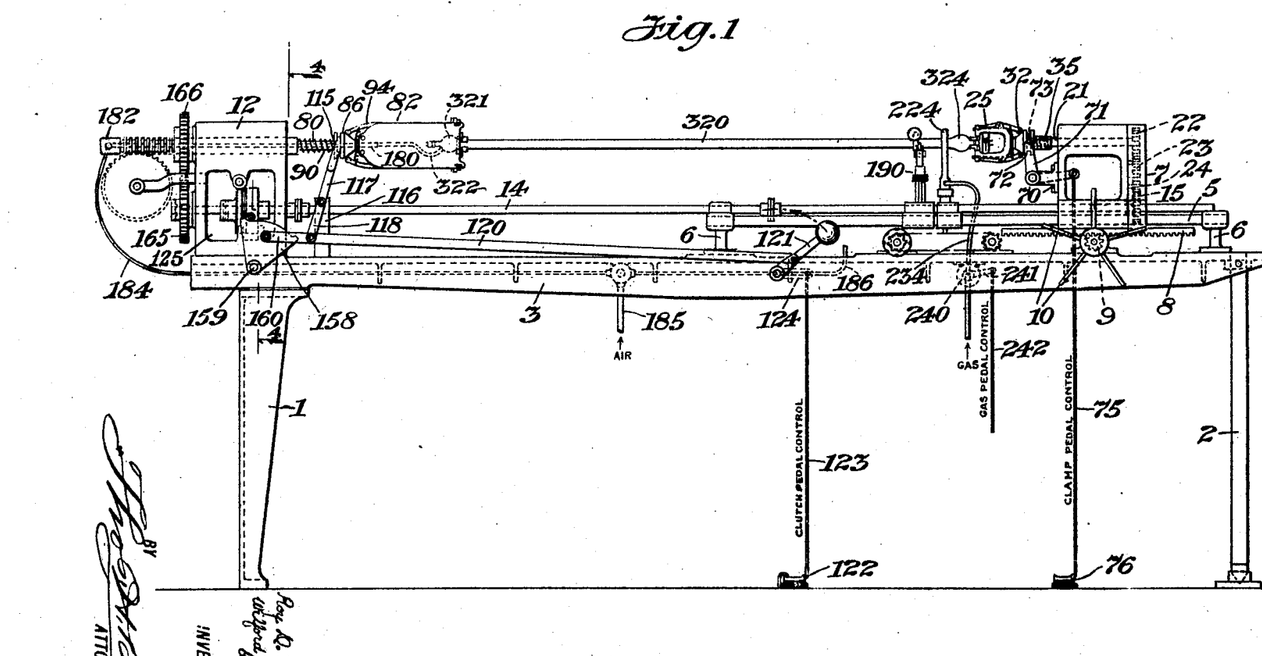
Figure 2:
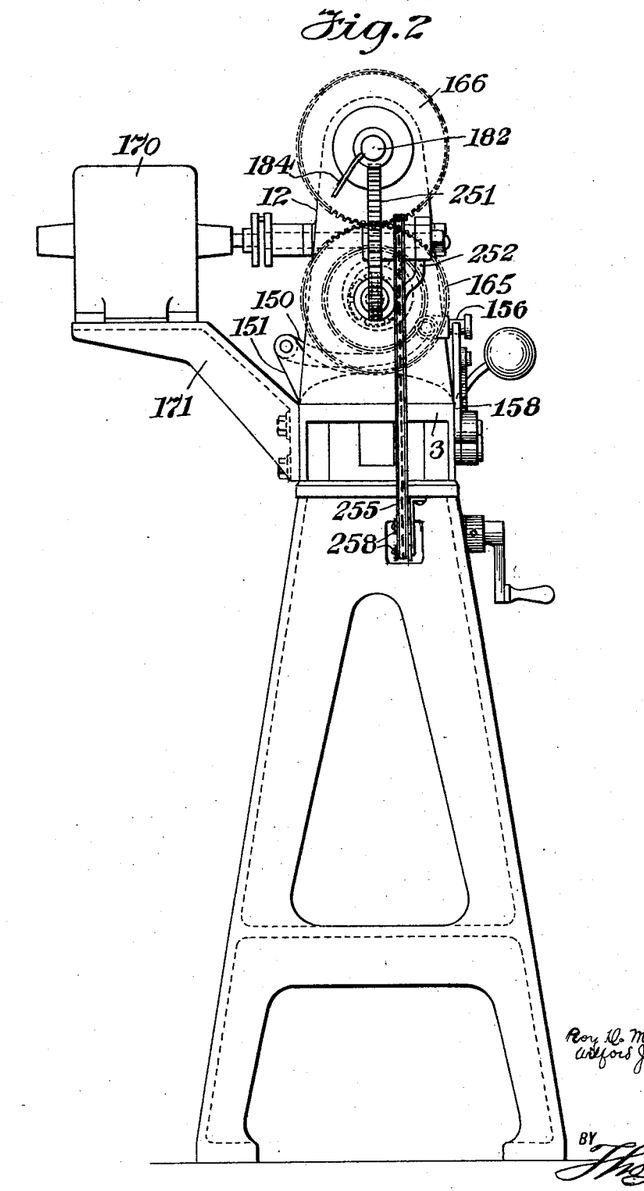
Fig. 2 is an end elevation view taken by the left side of the machine of Fig. 1 showing the driving connections between the motor and the glass handling machinery and details of a clutch therebetween.
Figure 3:
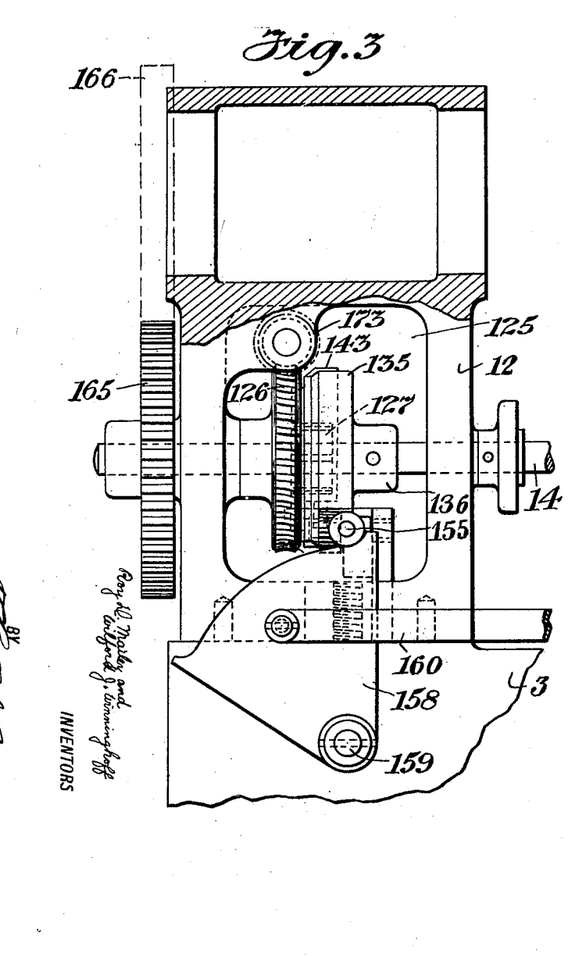
Fig. 3 is a front elevation view in part section taken at the extreme left end of the machine of Fig. 1 showing details of the clutch mechanism and means for operating it.
Figure 4:
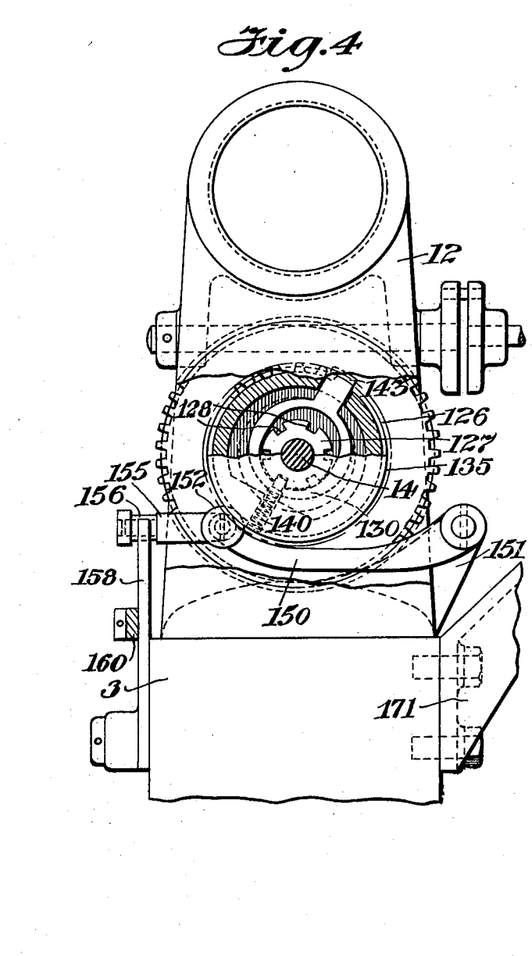
Fig. 4 is a section view along line 4—4 of Fig. 1 looking in the direction of the arrows showing details of the clutch mechanism and the means for controlling it.
Figure 5:
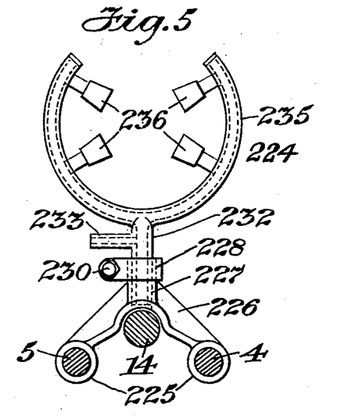
Figs. 5 and 6 are respectively side elevation and front elevation views of a gas flame heater for heating the glass to be worked on the machine.
Figure 6:
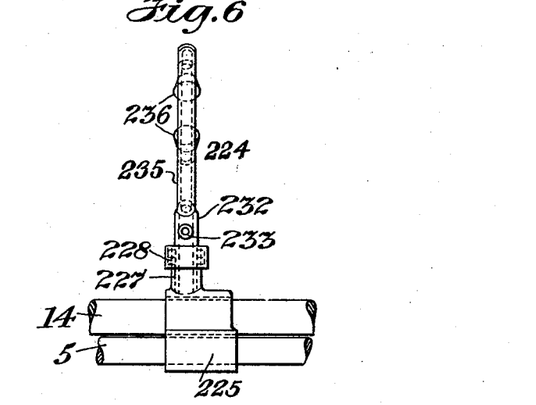
Figure 9:
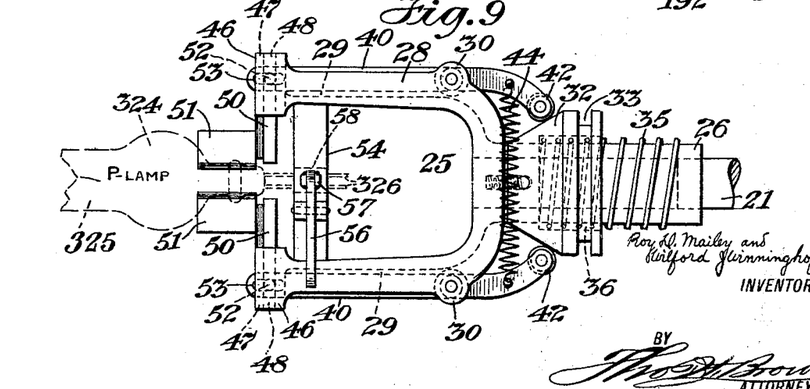
Fig. 9 is an elevation view of one of the clamps used on the machine showing means for effecting the opening and closing thereof and showing in dotted lines a glass bulb as being held in the clamped position therein.
Figure 18:
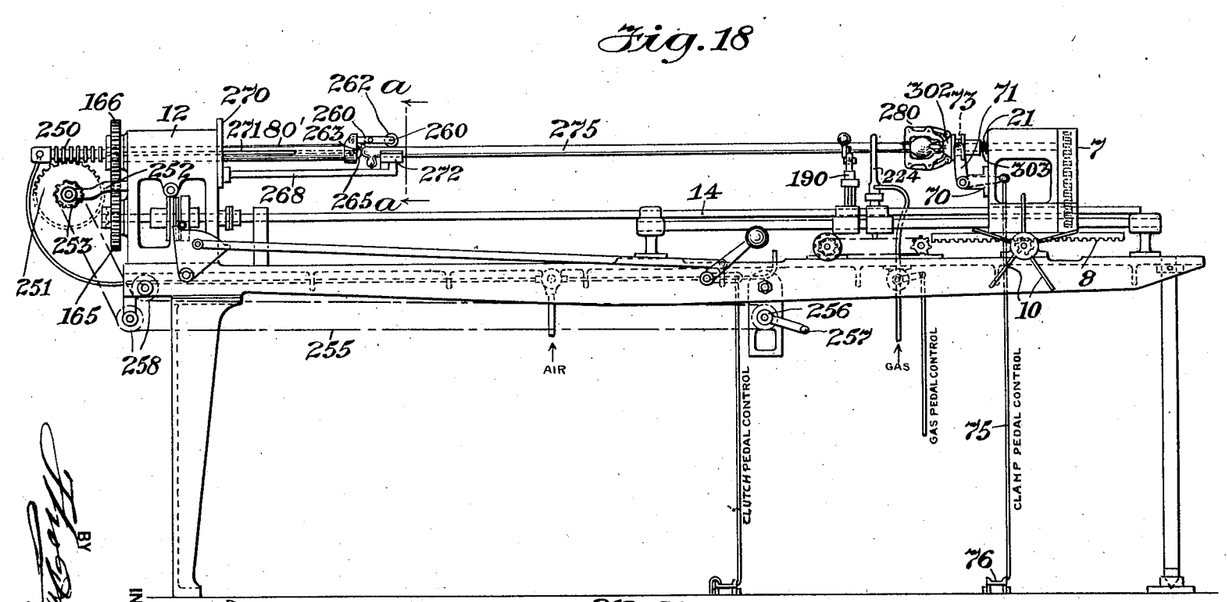
Fig. 18 is an elevation view similar to Fig. 1 of another embodiment of my invention which is similar to Fig. 1 except that the clamp at the left end is replaced by a simpler clamp adapted to hold a straight piece of glass tubing and which is adapted for simple operation.

The sleeve 26 mounted on the inner end of shaft 21 carries the U shaped member 28 which has channels 29 along the outer surfaces of its leg members. Near each of the two corners formed by the bottom of the U and respective leg members are formed bosses 30, 30 on either side of said channels 29. Slidably mounted on sleeve 26 is the annular cone member 32 which tapers inwardly toward said U member 28 and which at its opposite end has formed therein the annular channel 33. A spring 35 fixed at its outer end to said sleeve 26 and at its inner end resting against the bottom of the counterbore 36 formed in the outer end of said cone member 32 tends to force the cone member towards said U member 28. Pivoted between the respective pairs of said bosses 30, 30 and aligned in said slots 29 are the actuated bar members 40, 40 which are curved inwardly toward the cone 32 at the end nearest said cone and which carry at that end a roller 42 which is normally in contact with the conical surface of the cone member. A spring 44 connecting said members 40, 40 between the respective bosses 30, 30 and the rollers 42, 42 tends to hold said rollers 42, 42 against said cone 32. At its outer end each of the leg members of the U member 28 carries a T head 46. These heads have formed therein the vertically aligned slots 47 which communicate with said channels 29. In the lateral faces of said slots are formed channels 48, 48 which in each T head form a pair facing each other and which are aligned from one T head to the other. Slidably mounted in each of said pairs 48 is the jaw member 50, the two of them forming a cooperating pair which carry at their inner ends the clamp members 51, 51. Each of said members 50 carries at its outer end a pin 52 each of which engages a slot 53 in the end of the corresponding bar member 40 whereby said clamp members 51, 51 may be moved toward or from each other through the action of spring 44 and cone 32 when said cone 32 is moved one way or the other on sleeve 26 to actuate or cause the actuation by said spring 44 of said bar members 40, 40. Referring to Figs. 1, 9 and 18 said block 7 carries pivoted thereto on the support member 70 the bell crank 71 which terminates in a U member 72 straddling the channel 33 of said cone member 32, each of the legs of the U member carrying a pin 73 which engages said channel 33. A rod 75 pivoted to the other end of the bell crank 71 and connecting with a foot pedal 76 serves to transmit movement from said foot pedal whereby the cone member 32 is moved backward and forward for the opening and closing of said jaw members 51, 51, said spring member 35 tending to move said jaw members into close and clamping position. A transverse bar 54 is carried by the U-member 28 near the ends of the legs thereof, said bar having an opening therein in a position to receive the leads 326 extending from a glass bulb 324 held by the jaws 51. The handle 56, pivoted on the bar 54, connects with a bar 57 which serves to clamp the leads 326 within the opening 58, suitable spring mechanism being employed to normally maintain the bar 57 in clamping position.

Figures 10, 11:
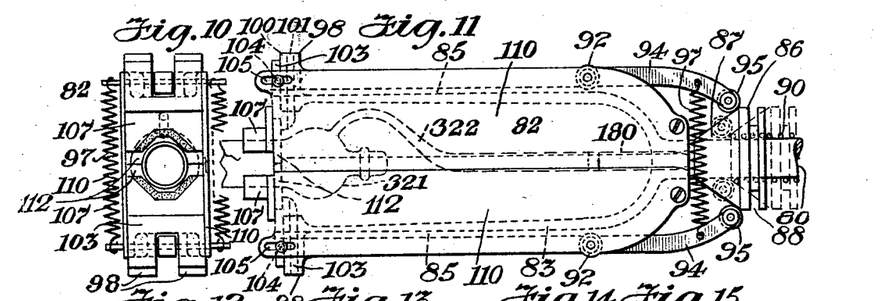
Figs. 10 and 11 are respectively end and elevation views of the other clamping mechanism showing means for operation of the same and showing in dotted lines the glass bulb as being held in the clamped position therein with a tubulation from said bulb extending longitudinally through the body of the clamp and terminating in a hollow shaft supporting said clamp. This figure further shows a substantially gas tight casing mounted on and movable in part with the members of the clamp whereby air pressure may be applied to the tubulation from said hollow shaft without substantial leakage.
Figures 12, 13:
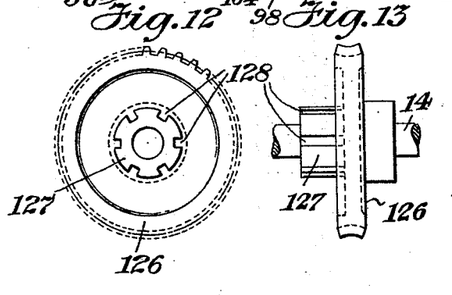
Figs. 12 and 13, 14 and 15, and 16 and 17 are side and elevation views respectively of respective parts of the clutch apparatus of the machine.
Figures 14, 15:
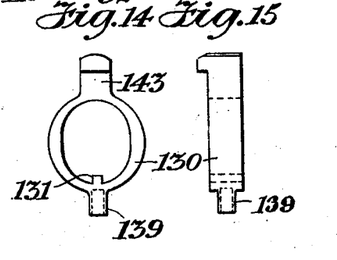
Figures 16, 17:
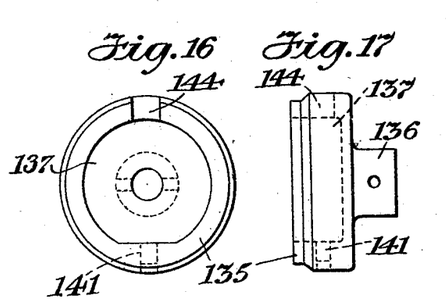

Journalled in said block member 12 and axially aligned with said shaft 21 is the hollow shaft 80 which at its inner end carries the clamp member 82 (see Figs. 1, 10 and 11). Similar to said clamp 25 clamp 82 comprises a U member 83 extending inwardly toward said clamp 25 and having channels 85 formed in the outer surfaces of its leg members. Back of said U member 83 is slidably mounted on shaft 80 the cone member 86 which has a surface 87 tapering inwardly toward said U member 83 and which has formed therein at its opposite end the annular channel 88. A spring 90 fixed to said shaft 80 and bearing against said cone member 86 tends to move the cone member toward said U member 83. Near their inner ends each of the leg members of the U carry bosses 92, 92 on either side of the respective channels 85, 85 and which pivotally support the bar members 94, one of which is located in each of said channels 85, 85. The members 94 curve backwardly and inwardly toward said cone member 86 and carry at their ends the respective rollers 95, 95 which bear against said cone surface 87. A tension spring 97 connecting said bar members 94 near their roller ends tends to hold said rollers against the cone. Said bar members 94, extend longitudinally of and beyond the outer ends of the leg members of the U member 83. At their outer ends each of the leg members of the U carries a T head 98 which has formed in its outer end a channel 100 communicating with the respective channel 85 and which has formed in the inner lateral faces thereof the oppositely disposed channels 101, 101 in alignment with the corresponding pair of channels in the other T head. Slidable vertically in each of the pairs 101, 101 is a member 103 which through respective pins 104, 104 engage respective slots 105, 105 formed respectively in the end of said bar members 94 whereby movement of said bar members 94 about their respective pivots 92, will cause said members 103, 103 to move toward or away from one another. At their inner ends said members 103, 103 carry the cooperating jaw members 107, 107. Plate members 110, 110 extending from one leg of the U to the other and longitudinally thereof serve to inclose the space bounded by said leg members and to provide a pressure chamber for open ended glass tubes held by the clamp whereby air pressure is imparted to the interior of said tubing for the suitable working thereof. At their inner sides each of said members 103 carries a rubber flap 112 movable therewith and which together serve to close the space at the front of the clamping member when the clamp is closed, said flap members being of such size and flexibility as to meet each other and flex sufficiently to close the front to withstand a pressure that will bend molten glass. A U shaped member 115, whose ends are bent inwardly to fit into said channel 88, is attached to the end of an arm 117 which is pivotally supported above the bed plate 3 by the standard 116 and serves to move said cone member 86 backward and forward for the opening or closing of said clamp members 107, said spring 90 tending to hold said cone member in a position in which said clamps will be held closed as above described. An extension 118 of said arm 117 extends below its pivot on said standard 116 and connects with and pivots to the bar member 120 which terminates at one end in a pivotal connection with the handle member 121 mounted on the machine at the operator's position and near said pedal 76. An arm 124 rigidly connected to the handle member 121 is connected by the rod 123 to a pedal 122, which serves as an alternative operating means.

Referring to Figure 1 to 4 and 12 to 17 said shaft 14 has rotatably mounted thereon and within the opening 125 in said block 12 the gear 126 which has concentrically formed thereon the projecting boss 127 which has formed in the lateral face thereof the slots or channels 128. About said boss 127 and movable on the face thereof in any direction with respect thereto is the ring member 130 which carries on its inner surface the dog 131 which is of such size and shape as to fit in any of said channels 128 and which is movable into and out of engaging relation thereto. About said ring member is the enclosing and guiding member 135 which is fixed to shaft 14 by its boss 136 in such a position that the hollow interior chamber 137 thereof faces said gear 126 and encloses said boss 127 and the encircling ring member 130, the inner face of said member 135 being closely spaced to the opposing face of said gear 126. On the outer surface of member 130 and at a point opopsite the lug or dog 131 is formed the hollow boss 139 in which is positioned one end of a compression spring 140 which has its opposite end positioned in the bore 141 formed in the lateral surface of said chamber 137 of member 135. On the outer surface of member 130 and at a point diametrically opposite boss 139 is formed the lug member 143 which is positioned and slidable in the slot 144 formed in the lateral boundary of chamber 137 opposite said bore 141 and which serves to hold said member 130 properly positioned with respect to said member 135 and which normally projects beyond the outside of said member 135 in which position said spring 140 tends to hold it. Said lug 143 is of such dimensions with respect to the lateral face of said member 135 and with respect to the size and shape of said lug 131 and the channels 128 that when its outer end is moved inwardly to a position in which it is substantially flush with the lateral surface of 135 that said lug 131 is out of engaging relation with said slots 128. Positioned underneath member 135 is the bar member 150 which is hinged at its back end to the lug 151 formed at the back of said block 12 near its forward end said bar 150 carries the roller 152 which is movable against the lateral surface of member 135 in which position it will engage the outer end of said lug 143 upon its rotation to that position and which upon such engagement through the upward movement of bar 150 on its pivot will cause said lug 143 to be moved inwardly into member 135 whereby said lug 131 will be moved out of engaging relation with said slots 128 against the compression of said spring 140. For the suitable movement of said roller 152 into operative relation with said lug 143 said bar member 150 is provided with a frontwardly projecting stud 155 which carries the roller 156. Underneath said roller 156 is provided the cam member 158 pivoted on the stud 159 and pivotally connected to said bar member 120 by the extension 160. Said cam 158 is formed so that it will move bar member 150 into engagement with lug 143, thus forcing the dog 131 from a slot 128 of boss 127, simultaneously with the opening of the clamp 82 when bar 120 is moved through the operation of handle 121 or pedal 122.

At the outward side of block 12 and on said shaft 14 is mounted the gear 165 which meshes with the gear 166 mounted thereabove on an outward extension of said hollow shaft 80. At the back of block 12 is mounted the motor 170 on the projecting member 171 fixed to said bedplate 3, which motor carries the worm gear 173 which meshes with said gear 126.

Said hollow shaft 80 carries on its inner end the tube 180 which projects within the air chamber of said clamp member 82. At its outer end said hollow shaft 80 carries the small housing 182 which encloses its outer end, is fixed against rotation with the shaft, and connects with a suitable source of air pressure, not shown, through the tubes 183—185. A Y extension 186 of said tubes 184 and 185 which has its open end terminating on the machine near the position of the operator serves through proper finger pressure thereon in a manner well known in the practice of glass blowing to regulate the pressure of air imparted at tube 180.

Figure 7:
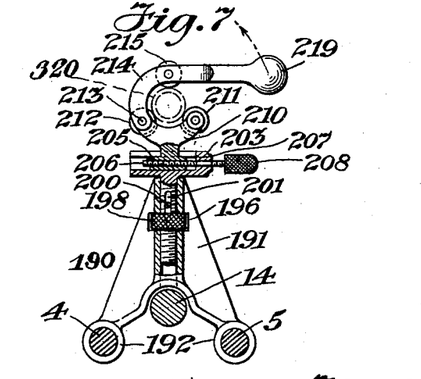
Figs. 7 and 8 are respectively side and front elevation views, both in part section, of an adjustable supporting means for a glass tube to be held by the machine.
Figure 8:
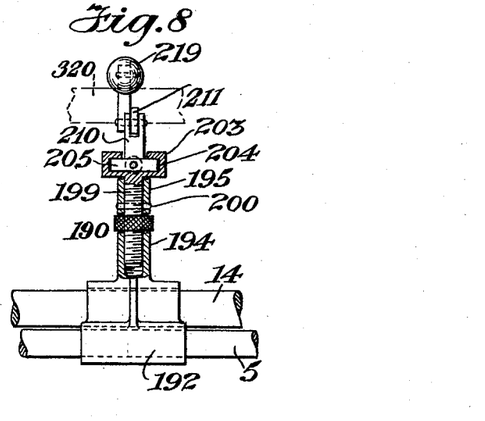

Referring to Figures 1, 7 and 8, there is provided near said clamp member 25 an adjustable tube supporting member 190 which comprises the yoke member 191, the bosses 192 on the bottom of which are mounted on and slidable over said slide rods 4 and 5. Said yoke 191 carries the vertically extending axially aligned and spaced apart tube members 194 and 195 between which in slot 196 of yoke 191 is mounted the thumb nut 198 through which passes the screw member 199 vertically slidable in said tubes 194 and 195 and which is held against rotation by the pin 200 extending through the slot 201 formed in screw 199 and fixed to said tube member 195. By the rotation of the thumb nut 198 on screw 199 the latter can be caused to move upwardly or downwardly as desired. At its upper end said screw 199 carries the slide channel member 203, in the horizontal slot 204 of which is mounted the slide 205 which is slidable in said slot 204 by means of the screw 206 which passes loosely through the back 207 of the member 203 and is threaded through the slide 205 itself, a suitable handle 208 being provided for the rotation of the screw. At its upper surface the slide 205 carries the yoke 210 which carries the tube supporting rollers 211 and 212. On the axle 213 of roller 212 is hinged the curved member 214 which carries a roller 215 movable into engagement with a tube supported by said rollers 211 and 212 which tube is indicated at 320 in Fig. 7 by the dotted lines. The handle 219 is provided for member 214 for moving roller 215 into and out of engagement with tube 320 and for opening the holder for the placing and removal of the tube thereinto or therefrom.

Referring to Figures 1, 5, 6, 18 and 20 said slide rods 4 and 5 carry between said holder 190 and said clamp 25 the gas fires 224 by means of the bosses 225 which are slidable over said rods and which are connected together through member 226 which carries the vertically disposed socket 227 which has at its top the flexible clamp member 228 which is adjustable through the nut and bolt 230. Adjustably mounted in said socket 227 through said clamp 228 is the hollow stem 232 having a gas inlet 233 connecting therewith at one side to a suitable source of gas supply not shown through the flexible tubing 234 and which carries at its top the flame holder 235 which is hollow and connects with said tube 232 and which carries the gas burner 236 arranged to impinge heat therefrom toward a common center within said holder 235 and directly above the point between said slide rods 4 and 5. A valve 240 is provided in tube 234 and has connection through the arm 241 and the rod 242 to a suitable foot pedal not shown for the regulation of the flow of gas to the burners 236.

Referring to Figures 2, 18, 19 and 20 there is shown a clamping arrangement at the left end of the machine different from that of clamp 82 as well as the operating parts therefor which is adapted to handle a straight ended tubulated tube in place of a tube formed with bulb thereon as shown in Fig. 1. In this other embodiment said block 12 carries in place of hollow shaft 80 the shaft 80′ mounted for axial movement as well as for rotational movement therein in a manner hereinafter fully described. At its outer end said shaft 80′ carries the rack 250 each of the teeth of which is formed as an annulus. Engaging said rack 250 is the gear 251 mounted to block 12 by means of the arm 252. The pinion 253 concentrically mounted to gear 251 connects through the sprocket chain 255 to the pinion and handle 256, 257 mounted at the front of the machine near the operator's position, the pinions 258, 258 at the end of the machine serving to take the bend in the chain 255 as it passes from the end of the machine downwardly to the bottom and front of the machine.

Figure 19:
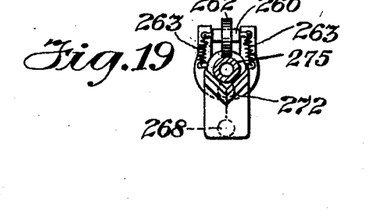
Fig. 19 is a sectional vew along line a—a of Fig. 18 showing an end view of the clamp with a piece of glass tubing therein.

At the end of shaft 80′ is pivotally mounted the hinged clamping member 260 which carries at its outer end clamping roller 262. The springs 263, 263 connected at one end to said member 260, one on either side, and with their other ends to the end of said shaft 80′ serve to pull said clamping member 260 and roller 262 downwardly. Beneath said clamping member 260 said shaft 80′ carries a rubber stopper 265 having a central opening therethrough which connects with the hollow interior of said shaft 80′. Extending parallel to said shaft 80′ and mounted to the plate 270, is the supporting bar 268, said plate 270 being mounted about the shaft 80′ and rotatable therewith, longitudinal movement of shaft 80′ with respect to plate 270 being provided for by the channel 271 in shaft 80′ and a spline riding therein and fixed to plate 270.

At its outer end said bar 268 carries a V block 272 adapted to cooperate with said roller 262 for clamping a glass tube. This clamp is adapted to receive the end of a tubulated glass tube 275 and for closing the end of the tube to make it air tight. The glass tube having a tubulation extending axially from the end thereof is inserted between roller 262 and the block 272 with the tubulation extending through the central opening of rubber tip 265 and the end of the glass tube itself being pushed firmly against the rubber of the tip. The springs 263 will then hold the tube in air tight position against the rubber tip.

Figure 21:
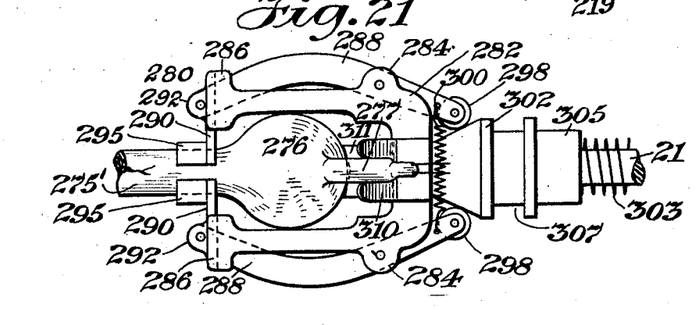
Fig. 21 is a side elevation view showing an alternate clamp structure.

In Figs. 18, 20 and 21 is shown a clamp 280 for holding a bulbed end 276 of a lamp having a lateral tubular extension 277 of glass sealed thereto which carries a lamp electrode. Said clamp 280 comprises a U shaped member 282 which is fixed to the shaft 21 which has laterally extending pairs of lugs 284, one pair near each of the corners of the U. At the end of each leg of the U is provided at the outer edge thereof a pair of laterally extending lugs 286, 286. Between each pair of lugs 284 is pivoted an arm 288 which as shown is bowed and extends forwardly and between the said lugs 286, one between each pair. Between the members of each pair of lugs 286 is mounted a clamp slide 290 which moves in a slideway formed in the inner surface of said lugs 286. Each of the said clamp slides 290 is pivoted to the outer end of the corresponding arm member 288, lug 292 being provided on the members 290 for this purpose, the members 290 being slotted at this portion and the outer ends of members 288 extending through the respective slides. At their inner ends said clamp slides 290 carry clamping members 295 which as shown have curved inner surfaces adapted for clamping the sides of a glass tube after admitting a bulb 276 on the glass tube 275′ to the space between the legs of the U.

At their ends opposite the clamping members each of said arm members 288 extend backwardly and terminate in forks between which are mounted rollers 298. A tension spring 300 fixed at each end to said arm members 288 near said rollers 298 tend to draw these roller ends of said arm members 288 toward each other and thereby open the clamps 295, 295. The frusto conical member 302 mounted about shaft 21 and contacting with said rollers 288 serves by longitudinal movement on the shaft 21 to force the roller ends of arms 288 apart and thereby to close said clamps 295. The spring 303 mounted between the block 7 and a cylinder 305 which extends through the end of cone 302 tends to hold said cone 302 against said rollers 298 for moving said clamps 295 into the clamping position (see especially Figs. 18 and 20). Similar to the construction in the clamps in Figs. 9 and 11 said cone 302 is provided on the cylindrical extension 305 thereof with the annular channel 307 which serves for engagement with the pins 73 of the arm 71, whereby upon depression of the foot pedal 76 the connecting rod 75 causes said arm 71 to withdraw said cone 302 from the rollers 298 to permit said spring 300 to move arms 288 to open said clamping members 295. For more securely holding the bulb 276 in place the notched member 310 is fixed to the base of the U member 282 and extends forwardly and laterally toward the outer end of the U to provide a fork for receiving the tubular extension 277 on the bulb 276 of the tube 275′, whereby the tube is secured against rotation in the clamp. A block 311 carried by the U-member 282 forms an abutment for the end of the bulb 276.

In the use of the above described apparatus for splicing a bulb having electrodes extending axially therefrom onto a tube of glass having another bulb at its other end the operations are as follows, particular reference being made to Figures 1, and 3 to 17 inclusive.

As shown in Fig. 1, the glass tube 320 having a bulb 321 fixed thereto and a tubulation 322 from the bulb is mounted in the machine with said bulb 321 within the clamp 82, the lever handle 121 having been moved to the right to move cone 86 away from the roller ends of arms 94, 94 to permit said springs 97, 97 to open the clamping jaws 107—107. After mounting the bulb 321 and its tubulation 322 in chuck 82 the opposite end of tube 320 is placed on the rollers 211 and 213 of the supporting member 190 and the roller 215 brought to rest on the top of the tube. The clamp 82 is then closed by moving handle 121 back to the left to move cone 86 into the clamp closing position. With this movement of handle 121 to the left the cam 158 will move the arm 150 to retract the roller 152 from engagement with the lug 143 whereby the spring 140 will move the ring 130 into engaging relation with the slots 128 whereby when the driving motor is actuated the lug 131 will fall into one of the slots 128 to effect driving engagement between the motor and shaft 14 and shaft 80. The bulb 324 is clamped between the jaws 51, 51 of clamp 25 with its tubular extension 325 in axial alignment with said tube 320 and with the electrodes 326 thereof positioned in the clamping space 58 of the clamp 54 which is opened and closed by the handle 56.

The burners 236 are now brought to a position about the open end of tube 320 by movement on the slides 4, 5 and the end of the tubular extension 325 of bulb 324 is brought close to said end of tube 320 by movement of the supporting block member 7 through the handles 10. The tube 320 and the bulb 324 are now set in rotation. The flames from the burners 236 are now controlled through a suitable foot pedal (not shown) to bring the ends of tubes 320 and 325 to splicing temperature whereupon they are brought against each other through movement of tube 325 against tube 320 by means of the handles 10. Pressure is then applied to the interior of the tubes through control of the flow of air through tube 186 with the finger of the operator to raise and lower the pressure in tube 184 and the interior of clamp 82 whereby pressure on the interior of tubes 320 and 325 is controlled. This pressure control and variation is carried on in a manner well known in the art for the proper splicing of two tubes after sufficient cooling of the weld for the glass to sustain its weight the handle 121 is moved to the right to dis-engage the clutch mechanism and to open the clamp 82. Clamp 25 is then opened and the tube 320 with the bulb 324 spliced thereonto is removed.

In Figs. 18, 19, 20 and 21 are shown adaptations of the machine above described for splicing a straight tube having a closed end on to a bulb having a tubular extension extending angularly therefrom near its outer end. For holding the bulb 276 the clamp 280 is opened in a manner similar to clamp 25 with the tubular extension 275′ engaged by the clamping members 295—295 and the angular projection 277 being inserted between the forks of holder 310, the end of the bulb 276 resting against the block 311 mounted on the inner end of said U shaped member 282 and extending inwardly therefrom. This clamp 280 is opened and closed through the foot pedal 76 in the same manner as is said clamp 25. The tube 275 having one end open and the other closed with the tubulation thereon is placed with the tubulation through the opening of rubber tip 265 with the end of the tube against said tip 265 and is clamped in this position by the roller 262 which is held against the side of tube 275 by the springs 263. The end of tube 275 which is open is placed between rollers 211—212 and 215 of the supporting member 190. The burners 236 and the end of the tubular extension 275′ of bulb 276 are then brought into welding relation to the end of tube 275 and splicing of these tubes is done in the manner above described in connection with the machine of Fig. 1.

Claims:
1. In a machine for joining hollow glass bodies, a clamp adapted for holding a hollow piece and for transmitting air pressure to the interior thereof comprising a shell having means for connecting the interior of the shell to a source of air pressure, movable clamping members in operable relation to said shell and movable wall members at an opening in said shell adapted for closing about a hollow glass member held by the clamps.

2. In a machine for joining hollow glass bodies, a clamp adapted for holding a hollow piece and for transmitting air pressure to the interior thereof comprising a shell having means for connecting the interior of the shell to a source of air pressure and an opening for the reception of a hollow glass member, and clamp members adapted for holding the glass member and for closing said opening about the glass member.

3. A clamp adapted for holding a hollow glass piece and for transmitting air pressure to the interior thereof comprising a shell having means for connecting the interior of the shell to a source of air pressure, movable clamping members in operable relation to said shell and movable wall members at an opening in said shell adapted for closing about a hollow glass member held by the clamps.

4. In a machine for joining hollow glass bodies, a clamp adapted for holding a hollow piece and for transmitting air pressure to the interior thereof comprising a shell having means for connecting the interior of the shell to a source of air pressure and an opening for the reception of a hollow glass member, and clamp members adapted for holding the glass member and for closing said opening about the glass member.

5. In a glass working machine a clamp adapted for holding a glass piece during rotation thereof, comprising a shaft, a fork member extending from the shaft, a lever pivoted to each of the prongs of the fork, clamping jaws carried by said prongs and having connection with said levers whereby they may be opened and closed by movement of said levers on their pivots, and means for moving said levers to open and close the clamps.

6. In a glass working machine a clamp adapted for holding a glass piece during rotation thereof, comprising a shaft, a fork member extending from the shaft, a lever pivoted to each of the prongs of the fork, clamping jaws carried by said prongs and having connection with said levers whereby they may be opened and closed by movement of said levers on their pivots, means tending to hold the clamps open, and means for closing the clamps comprising a cone slidable axially on said shaft and projections on said levers for engaging the cone.

7. In a glass working machine a clamp adapted for holding a glass piece during rotation thereof, comprising a support member, side members extending from said support member, a lever pivoted to each of the side members, clamping jaws carried by said side members and having connection with said levers whereby they may be opened and closed by movement of said levers on their pivots, and means for moving said levers to open and close the clamps.

8. In a machine for working hollow glassware, a support, a shaft mounted on said support, means to drive said shaft, a second shaft adapted to be driven by said first shaft, a glass holding clamp on said second shaft, heating means in operable relation to glassware carried by said clamp, and a clutch member between said driving means and said first mentioned shaft comprising an element having a notched boss, a second element which is rotatable with respect to said first mentioned element, said second element having a flange facing said boss and having an annular shoulder extending about said boss, and a member carried by said flange slidable into and out of engagement with the notches of said boss.

9. In a machine for working hollow glassware, a support, a shaft mounted on said support, means to drive said shaft, a second shaft adapted to be driven by said first shaft, a glass holding clamp on said second shaft, heating means in operable relation to glassware carried by said clamp, and a clutch member between said driving means and said first mentioned shaft comprising an element having a notched boss, a second element which is rotatable with respect to said first mentioned element, said second element having a flange facing said boss and having an annular shoulder extending about said boss, a member carried by said flange slidable into and out of engagement with the notches of said boss, and means tending to move said member toward said boss for engagement with a notch thereon.

10. In a machine for working hollow glassware, a support, a shaft mounted on said support, means to drive said shaft, a second shaft adapted to be driven by said first shaft, a glass holding clamp on said second shaft, heating means in operable relation to glassware carried by said clamp, and a clutch member between said driving means and said first mentioned shaft comprising an element having a notched boss, a second element which is rotatable with respect to said first mentioned element, said second element having a flange facing said boss and having an annular shoulder extending about said boss, a member carried by said flange slidable into and out of engagement with the notches of said boss, means tending to move said member toward said boss for engagement with a notch thereon, and means carried by said support for moving said slidable member away from said boss for disengagement from the notches thereof.

11. In a machine for working hollow glassware, a support, a shaft mounted on said support, means to drive said shaft, a second shaft adapted to be driven by said first shaft, a glass holding clamp on said second shaft, heating means in operable relation to glassware carried by said clamp, a clutch member between said driving means and said first mentioned shaft comprising an element having a notched boss, a second element which is rotatable with respect to said first mentioned element, said second element having a flange facing said boss and having an annular shoulder extending about said boss, a member carried by said flange slidable into and out of engagement with the notches of said boss, means tending to move said member toward said boss for engagement with a notch thereon, and means carried by said support for moving said slidable member away from said boss for disengagement from the notches thereof, and connecting means having a handle near said heating means for actuating said movable member into and out of actuating engagement with said slidable member.

12. In a machine for working hollow glassware, a support, a shaft mounted on said support, means to drive said shaft, a second shaft adapted to be driven by said first shaft, a glass holding clamp on said second shaft, heating means in operable relation to glassware carried by said clamp, a clutch member between said driving means and said first mentioned shaft comprising an element having a notched boss, a second element which is rotatable with respect to said first mentioned element, said second element having a flange facing said boss and having an annular shoulder extending about said boss, a member carried by said flange slidable into and out of engagement with the notches of said boss, means tending to move said member toward said boss for engagement with a notch thereon, and means carried by said support for moving said slidable member away from said boss for disengagement from the notches thereof, said clamp comprising a support member, side members extending from said support member, a lever pivoted to each of said side members, clamping jaws carried by said side members and having connection with said levers whereby they may be opened or closed by movement of said levers on their pivots, means for moving said levers to open and close the clamps, and means for actuating said lever moving means and said movable means which engages the slidable member of said flange for simultaneously opening said clamping jaws and disengaging said clutch and for simultaneously closing said clamping jaws and engaging the clutch members at will.

13. In a glass working machine, in combination, a support member, a driving shaft, a driven shaft, an engagable and disengagable clutch intermediate said shafts, a clamp on said driven shaft, means mounted to said support for engaging and disengaging said clutch and means mounted to said support for opening and closing said clamp, and means in operable relation with said clutch means and said clamp operating means for simultaneously opening said clamp and disengaging said clutch and for simultaneously closing said clamp and engaging said clutch at will.

14. In a machine for working hollow glassware, a support, a driving shaft mounted on said support, a second shaft adapted to be driven by said first shaft, a glass holding clamp on said second shaft, heating means in operable relation to glassware carried by said clamp, and a clutch member mounted on said driving shaft comprising a loosely mounted flange member having a gear and a notched boss thereon, a second flange fixed to said driving shaft facing said boss and having an annular shoulder extending about said boss, and a member carried by said second flange slidable into and out of engagement with the notches of said boss.

Signed at Hoboken, in the county of Hudson and State of New Jersey November, A. D. 1925.

WILFORD J. WINNINGHOFF.
ROY D. MAILEY.